(12) United States Patent
Muthiah et al.

(10) Patent No.: US 11,394,772 B2
(45) Date of Patent: Jul. 19, 2022

(54) SYSTEMS AND METHODS FOR PERSISTENCE ACROSS APPLICATIONS USING A CONTENT SWITCHING SERVER

(71) Applicant: Citrix Systems, Inc., Fort Lauderdale, FL (US)

(72) Inventors: Manikam Muthiah, Bengaluru (IN); Chiradeep Vittal, Santa Clara, CA (US); Raghav SN, Bengaluru (IN); Sanchita Ghai, Bengaluru (IN); Vinay Shivananda, Bengaluru (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 101 days.

(21) Appl. No.: 16/705,900

(22) Filed: Dec. 6, 2019

(65) Prior Publication Data

US 2021/0176304 A1 Jun. 10, 2021

(51) Int. Cl.
| | |
|---|---|
| *H04L 67/1027* | (2022.01) |
| *H04L 67/02* | (2022.01) |
| *H04L 67/1014* | (2022.01) |
| *H04L 67/14* | (2022.01) |
| *H04L 67/141* | (2022.01) |
| *H04L 67/145* | (2022.01) |
| *H04L 67/146* | (2022.01) |
| *H04L 67/01* | (2022.01) |

(52) U.S. Cl.
CPC .......... *H04L 67/1027* (2013.01); *H04L 67/02* (2013.01); *H04L 67/1014* (2013.01); *H04L 67/14* (2013.01); *H04L 67/141* (2013.01); *H04L 67/145* (2013.01); *H04L 67/146* (2013.01); *H04L 67/42* (2013.01)

(58) Field of Classification Search
CPC ... H04L 67/1027; H04L 67/146; H04L 67/42; H04L 67/145; H04L 67/02; H04L 67/1014; H04L 67/14; H04L 67/141; H04L 67/142
See application file for complete search history.

(56) References Cited

U.S. PATENT DOCUMENTS 6,671,259 B1 * 12/2003 He .................... H04L 67/1038
370/238.1
6,880,156 B1 * 4/2005 Landherr .............. G06F 9/5083
709/229

(Continued)

OTHER PUBLICATIONS

International Search Report and Written Opinion on PCT Appl. No. PCT/US2020/061818 dated Feb. 11, 2021.

*Primary Examiner* — Ramy M Osman
(74) *Attorney, Agent, or Firm* — Foley & Lardner LLP

(57) ABSTRACT

Disclosed herein includes a system, a method, and a device for providing persistence across applications using a content switching server. A device can receive a first request from a client for a version of an application having different versions provided by one or more servers. The device can provide access to each version of the application via different load balancing virtual servers. A content switching virtual server of the device can select a load balancing virtual server to handle the first request for the version of the application. The content switching virtual server can generate a session identifier for a session between the client and the version of the application to persist the session with the selected load balancing virtual server for subsequent requests from the client for the version of the application.

20 Claims, 10 Drawing Sheets

(56) References Cited

U.S. PATENT DOCUMENTS

| | | | | |
|---|---|---|---|---|
| 7,386,617 | B2* | 6/2008 | Apte | G06F 16/955 |
| | | | | 707/999.203 |
| 7,558,861 | B1* | 7/2009 | Qidwai | H04L 67/14 |
| | | | | 709/201 |
| 8,407,771 | B1* | 3/2013 | Hughes | H04L 9/3263 |
| | | | | 709/227 |
| 8,566,452 | B1* | 10/2013 | Goodwin, III | H04L 63/0281 |
| | | | | 709/227 |
| 8,762,787 | B2* | 6/2014 | Lam | G06F 11/3684 |
| | | | | 714/38.1 |
| 9,106,606 | B1* | 8/2015 | Hasson | H04L 67/1027 |
| 9,117,079 | B1* | 8/2015 | Huang | G06F 9/44505 |
| 9,838,482 | B1* | 12/2017 | Hardy | H04L 67/1027 |
| 10,402,191 | B1 | 9/2019 | Eapen et al. | |
| 10,630,808 | B1* | 4/2020 | Watt | H04L 67/1014 |
| 2001/0047415 | A1* | 11/2001 | Skene | H04L 67/1027 |
| | | | | 709/226 |
| 2004/0236799 | A1* | 11/2004 | Apte | H04L 67/02 |
| 2004/0250248 | A1* | 12/2004 | Halpern | G06F 9/5033 |
| | | | | 718/100 |
| 2006/0129684 | A1* | 6/2006 | Datta | H04L 67/1002 |
| | | | | 709/229 |
| 2006/0130133 | A1* | 6/2006 | Andreev | H04L 63/0263 |
| | | | | 726/11 |
| 2006/0212532 | A1* | 9/2006 | Burckart | H04L 67/14 |
| | | | | 709/217 |
| 2007/0094373 | A1 | 4/2007 | Brendel | |
| 2008/0010410 | A1* | 1/2008 | Zilbershtein | H04L 67/06 |
| | | | | 711/118 |
| 2008/0091837 | A1 | 4/2008 | Langen et al. | |
| 2008/0281969 | A1* | 11/2008 | Horton | H04L 67/18 |
| | | | | 709/227 |
| 2009/0013324 | A1* | 1/2009 | Gobara | H04L 67/1021 |
| | | | | 718/104 |
| 2009/0019166 | A1* | 1/2009 | Apte | H04L 67/02 |
| | | | | 707/E17.112 |
| 2012/0102226 | A1* | 4/2012 | Hopmann | H04L 67/1002 |
| | | | | 709/241 |
| 2015/0317218 | A1* | 11/2015 | Verde | H04L 67/1004 |
| | | | | 714/4.11 |
| 2016/0182399 | A1* | 6/2016 | Zadka | H04L 47/783 |
| | | | | 709/226 |
| 2017/0126812 | A1* | 5/2017 | Singhal | H04L 67/142 |
| 2019/0034315 | A1* | 1/2019 | Acosta | G06F 11/3409 |
| 2021/0132981 | A1* | 5/2021 | Thakkar | H04L 67/10 |
| 2021/0135957 | A1* | 5/2021 | Thakkar | H04L 43/0876 |
| 2021/0176304 | A1* | 6/2021 | Muthiah | H04L 67/02 |

\* cited by examiner

SYSTEMS AND METHODS FOR PERSISTENCE ACROSS APPLICATIONS USING A CONTENT SWITCHING SERVER

FIELD OF DISCLOSURE

The present disclosure is generally related to application systems and methods, including but not limited to systems and methods for providing persistence across applications using a content switching server.

BACKGROUND

Network devices can be connected or grouped together through multiple virtual wide area networks (WAN) or other networks together to form a cluster. Applications can be provided to each of the network devices through the cluster. However, to provide new or updated versions of an application, existing sessions to the application are terminated or ended in order to provide the new or updated version.

SUMMARY

Devices, systems and methods for providing persistence for applications using a content switching server are provided herein. In embodiments, a content switching virtual server can be provided to receive and process requests for applications to support and maintain persistence for sessions to the applications when multiple different versions of the applications are available and/or active. The content switching virtual server can receive client requests for one or more applications and partition or spread the requests across a plurality of load balancing servers supporting a plurality of server groups or client groups. For example, each server group can be load balanced by at least one load balancing server. The content switching server can support persistence across multiple load balancing groups by selectively deploying new versions or updated versions of an application to clients based in part on properties and characteristics of the client and/or application to provide persistence for active, existing, or stateful sessions to the application.

For example, if a client within the geographical area requests an application and has an active, existing or stateful session to the application, the content switching virtual server can maintain the persistent of the respective session and provide the client with the previous version of the application. If a client within the geographical area requests an application and does not have any active, existing or stateful sessions to the application, the content switching virtual server can provide the client with the new version of the application. Thus, the content switching virtual server can maintain and support persistence across multiple load balancing groups. The content switching virtual server can support and maintain previous or existing sessions to the application and deploy new versions or new features of the application for new requests from clients not associated with a previous or existing sessions to the application. The content switching virtual server can provide persistence and support and maintain the previous and existing sessions during deployment of new versions and/or updates to the application.

In at least one aspect, a method is provided. The method can include receiving, by a device intermediary to a plurality of clients and a plurality of applications, a first request from a first client of the plurality of clients for a first version of an application of the plurality of applications having different versions provided by one or more servers. The device can provide access to each version of the application via a different load balancing virtual server of a plurality of load balancing virtual servers of the device. The method can include selecting, by a content switching virtual server of the device, a load balancing virtual server from the plurality of load balancing virtual servers to handle the first request for the first version of the application. The method can include generating, by the content switching virtual server, a session identifier for a session between the first client and the first version of the application to persist the session with the selected load balancing virtual server for subsequent requests from the first client for the first version of the application. The method can include providing, by the content switching virtual server to the first client, the session identifier for the session between the first client and the first version of the application. The method can include forwarding, by the content switch virtual server, a second request from the first client to access the first version of the application to the selected load balancing virtual server responsive to identifying the session identifier associated with the second request.

In embodiments, the method can include receiving, by content switching virtual server, a third request from a second client for at least one version of the application. The method can include selecting, by the content switching virtual server, a second load balancing virtual server from the plurality of load balancing virtual servers to handle the third request. The second load balancing virtual server can provide access to a second version of the application. The method can include routing, by the content switching virtual server using a second session identifier, the third request to the selected second load balancing virtual server to provide access to the second version of the application for the second client. The session identifier can include a data unit included with the request and a value associated with the selected load balancing server; and wherein the data unit includes at least one of a source internet protocol (IP) address, a HyperText Transfer Protocol (HTTP) cookie or a secure sockets layer (SSL) session identifier.

The method can include determining, by the content switching virtual server, if the session identifier is to be created for the first client through a lookup to the storage of the device using a data unit included with the request. The method can include generating, by the content switching virtual server, responsive to the lookup, the session identifier for the session between the first client and the first version of the application. The method can include identifying, by the content switching virtual server, an internet protocol (IP) address associated with the first client. The method can include generating, by the content switching virtual server, the session identifier for the session between the first client and the first version of the application with the identifier corresponding to the IP address associated with the first client. The method can include identifying, by the content switching virtual server, a data unit for a secure sockets layer (SSL) session between the first client and the first version of the application. The method can include generating, by the content switching virtual server, the session identifier for the session between the first client and the first version of the application with the session identifier corresponding to the data unit for the SSL session between the first client and the first version of the application.

In embodiments, the method can include inserting, by the content switching virtual server, a cookie into a header of a response to the first request from the first client. The cookie can identify the selected load balancing virtual server. The method can include receiving, by the content switching virtual server, a third request from the first client for the first version of the application, the third request including the cookie. The method can include determining, by the content switching virtual server, the session identifier associated with the first client using the cookie, the session identifier corresponding to the session between the first client and the first version of the application. The method can include routing, by the content switching virtual server using the session identifier, the third request to the selected load balancing virtual server to provide access to the first version of the application.

In at least one aspect, a method is provided. The method can include establishing, by a device intermediary to a plurality of clients and an application, a different load balancing virtual server of a plurality of load balancing virtual servers of the device for accessing each version of a plurality of versions of the application provided by one or more servers. The method can include identifying, by a content switching virtual server of the device, a first identifier of a first request received by a client of the plurality of clients to access a first version of the plurality of versions of the application. The method can include determining, by the content switching virtual server using the first identifier, a first load balancing virtual server of the plurality of load balancing virtual servers was selected for the first client to access the first version of the application responsive to a previous request between the first client and the first version of the application. The method can include routing, by the content switching virtual server, the first request to the first load balancing virtual server to provide the first client access to the first version of the application.

In embodiments, the method can include receiving, by content switching virtual server, a second request from a second client for the version of the application. The method can include identifying, by the content switching virtual server, a second identifier included with the second request. The method can include performing, by the content switching virtual server, using the second identifier included with the second request, a lookup to a storage of the device for a session identifier associated with the second client. The method can include determining, by the content switching virtual server responsive to the lookup, that a session identifier is to be generated for the second client. The method can include selecting, by the content switching virtual server, a second load balancing virtual server to provide a second version of the application to the second client, the second version different from the first version. The method can include generating, by the content switching virtual server, a session identifier for a session between the second client and the second version of the application. The session identifier can include the first identifier included with the second request and a value associated with the second load balancing server. The method can include routing, by the server, the second request to the second load balancing server to provide access to the second version of the application for the second client.

In at least one aspect, a system is provided. The system can include a device intermediary to a plurality of clients and a plurality of applications. The device can include one or more processors coupled to memory. The one or more processors can be configured to receive a first request from a first client of the plurality of clients for a first version of an application of the plurality of applications having different versions provided by one or more servers. The device can provide access to each version of the application via a different load balancing virtual server of a plurality of load balancing virtual servers of the device. The one or more processors can be configured to select, via a content switching virtual server of the device, a load balancing virtual server from the plurality of load balancing virtual servers to handle the first request for the first version of the application. The one or more processors can be configured to generate a session identifier for a session between the first client and the first version of the application to persist the session with the selected load balancing virtual server for subsequent requests from the first client for the first version of the application. The one or more processors can be configured to provide, to the first client, the session identifier for the session between the first client and the first version of the application. The one or more processors can be configured to forward a second request from the first client to access the first version of the application to the selected load balancing virtual server responsive to identifying the session identifier associated with the second request.

In embodiments, the one or more processors can be configured to receive a third request from a second client for at least one version of the application. The one or more processors can be configured to select a second load balancing virtual server from the plurality of load balancing virtual servers to handle the third request. The second load balancing virtual server can provide access to a second version of the application. The one or more processors can be configured to route, using a second session identifier, the third request to the selected second load balancing virtual server to provide access to the second version of the application for the second client. The session identifier can include a data unit included with the request and a value associated with the selected load balancing server; and wherein the data unit includes at least one of a source internet protocol (IP) address, a HyperText Transfer Protocol (HTTP) cookie or a secure sockets layer (SSL) session identifier.

In embodiments, the one or more processors can be configured to determine if the session identifier is to be created for the first client through a lookup to the storage of the device using a data unit included with the request. The one or more processors can be configured to generate, responsive to the lookup, the session identifier for the session between the first client and the first version of the application. The one or more processors can be configured to identify an internet protocol (IP) address associated with the first client. The one or more processors can be configured to generate the session identifier for the session between the first client and the first version of the application with the identifier corresponding to the IP address associated with the first client. The one or more processors can be configured to receive a third request from the first client for the first version of the application, the third request including the cookie. The one or more processors can be configured to determine the session identifier associated with the first client using the cookie. The session identifier can correspond to the session between the first client and the first version of the application. The one or more processors can be configured to route, using the session identifier, the third request to the selected load balancing virtual server to provide access to the first version of the application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes a network environment and computing environment which may be useful for practicing embodiments described herein.

Section B describes embodiments of systems and methods for delivering a computing environment to a remote user.

Section C describes embodiments of systems and methods for virtualizing an application delivery controller.

Section D describes embodiments of devices, systems and methods for providing persistence across applications using a content switching server.

A. Network and Computing Environment

Figure 1A:
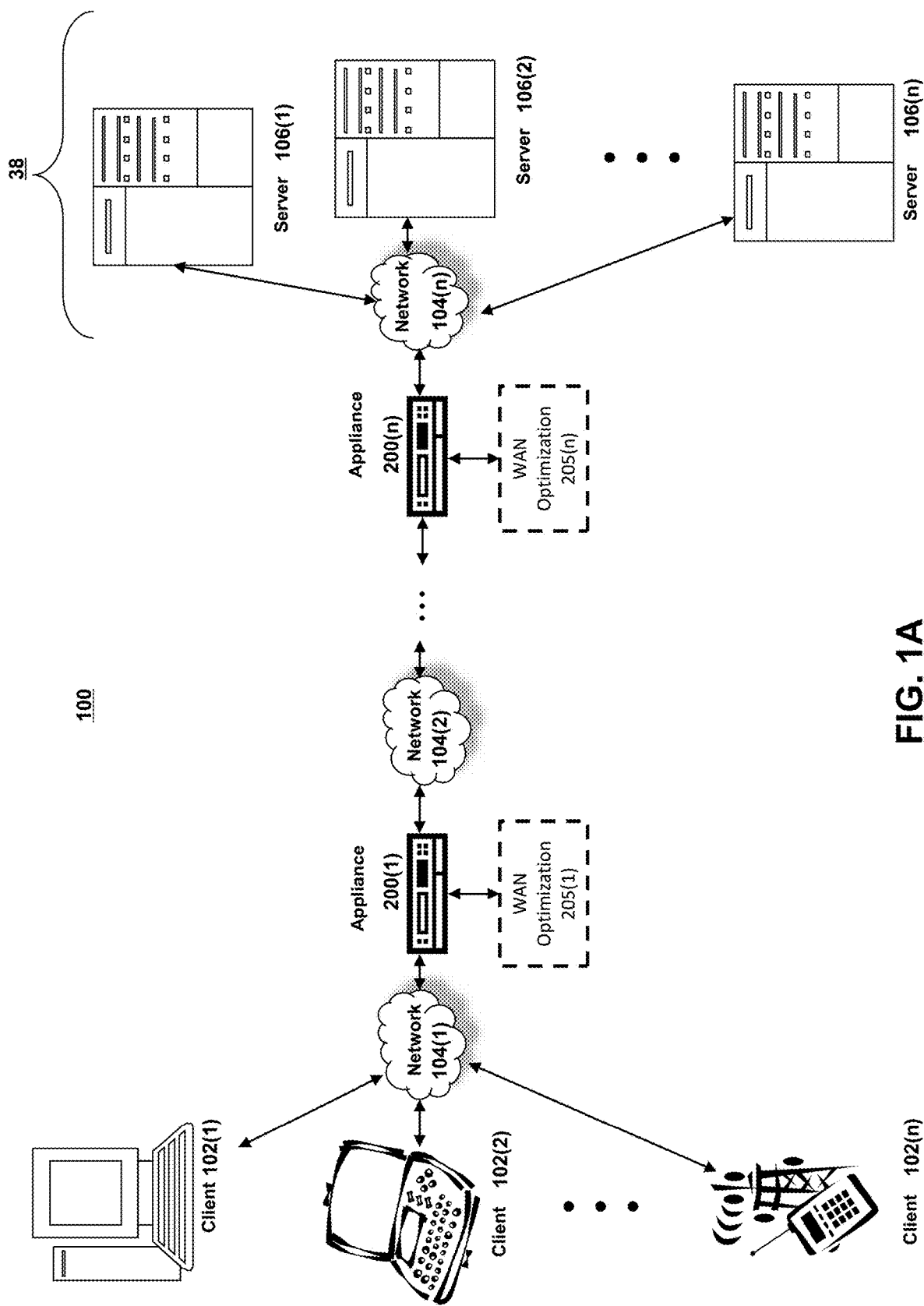
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
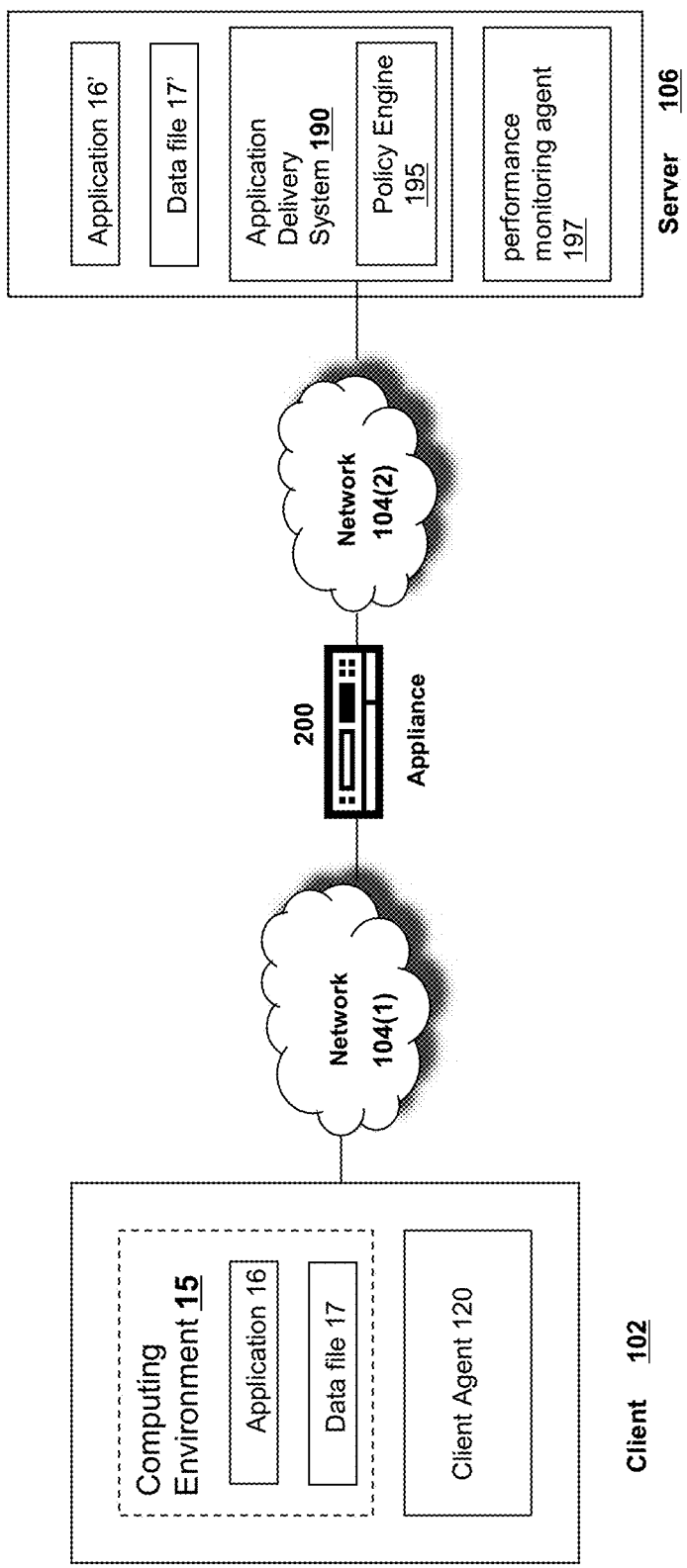
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
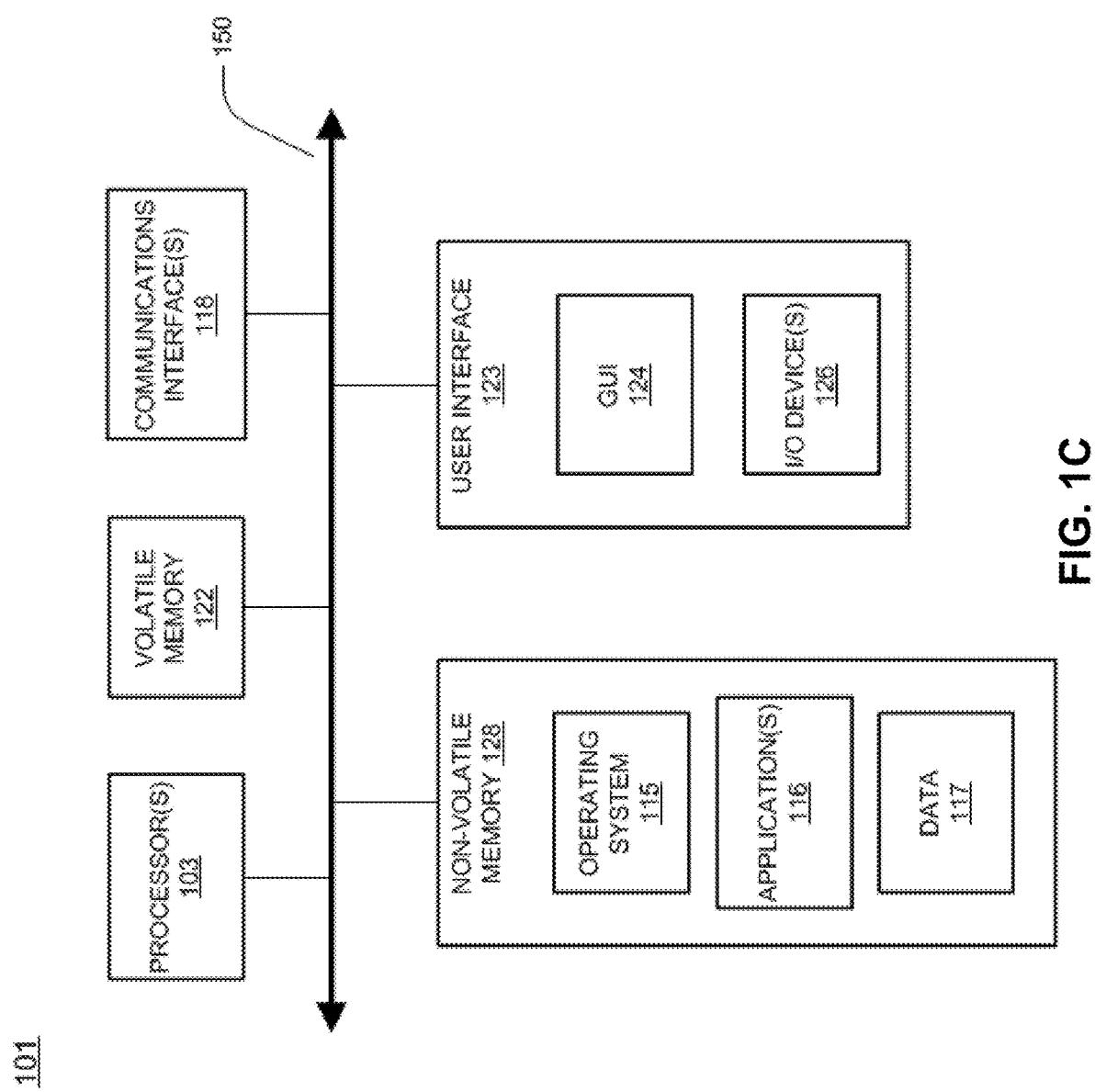
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 1D:
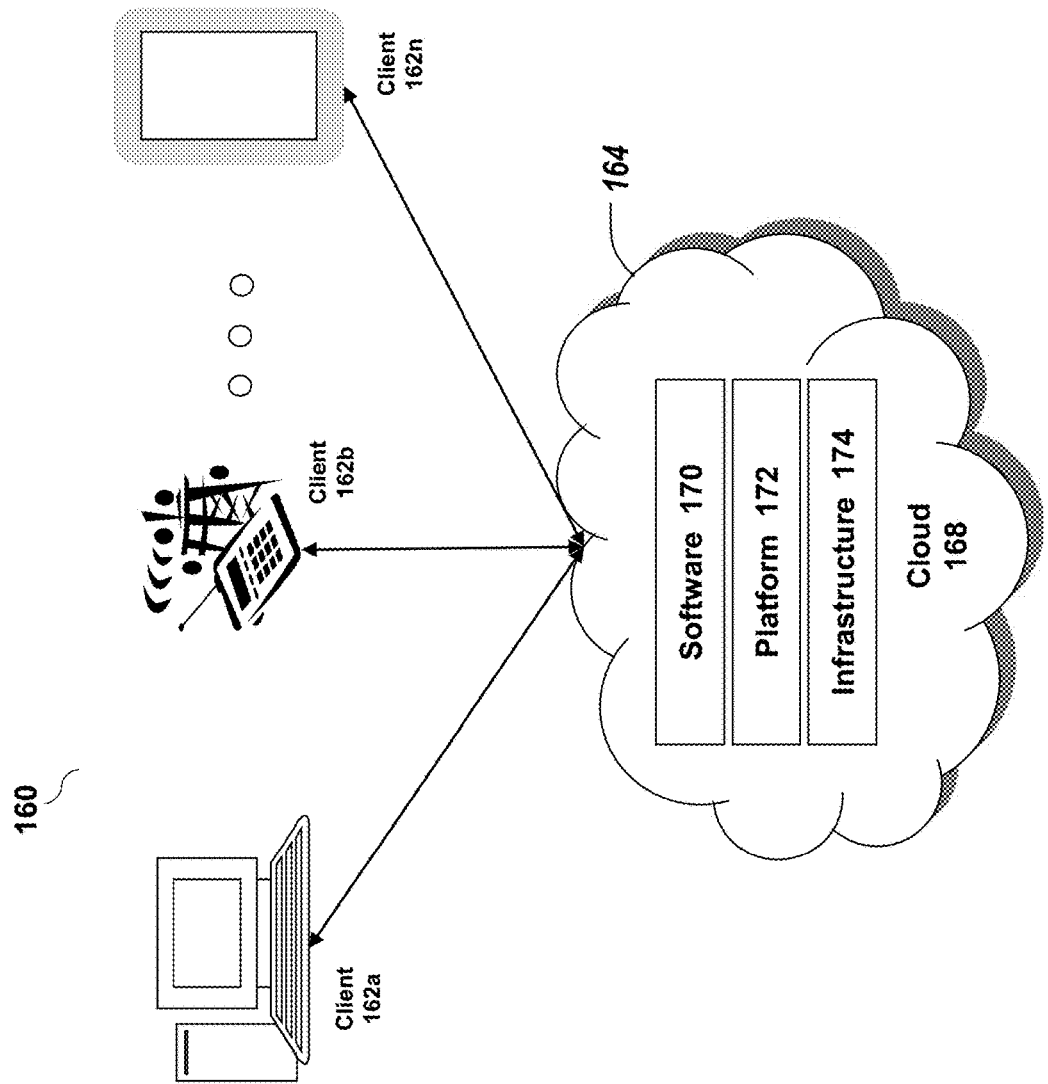
FIG. 1D is a block diagram depicting a computing environment comprising client device in communication with cloud service providers.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 160 may include one or more clients 162a-162n, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g. Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., Google Compute Engine provided by Google Inc. of Mountain View, Calif., or others. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and others. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
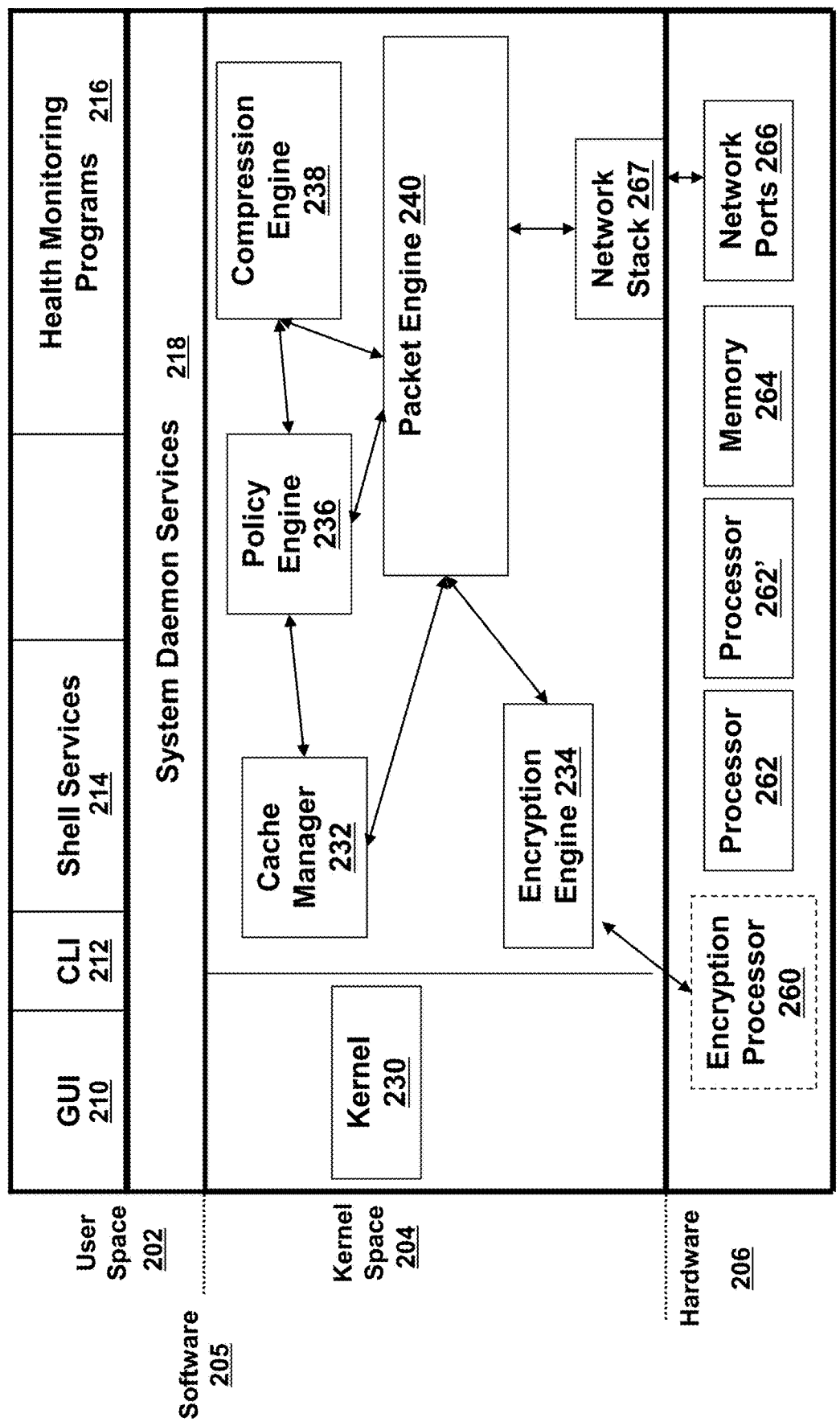
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of an application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s)

328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
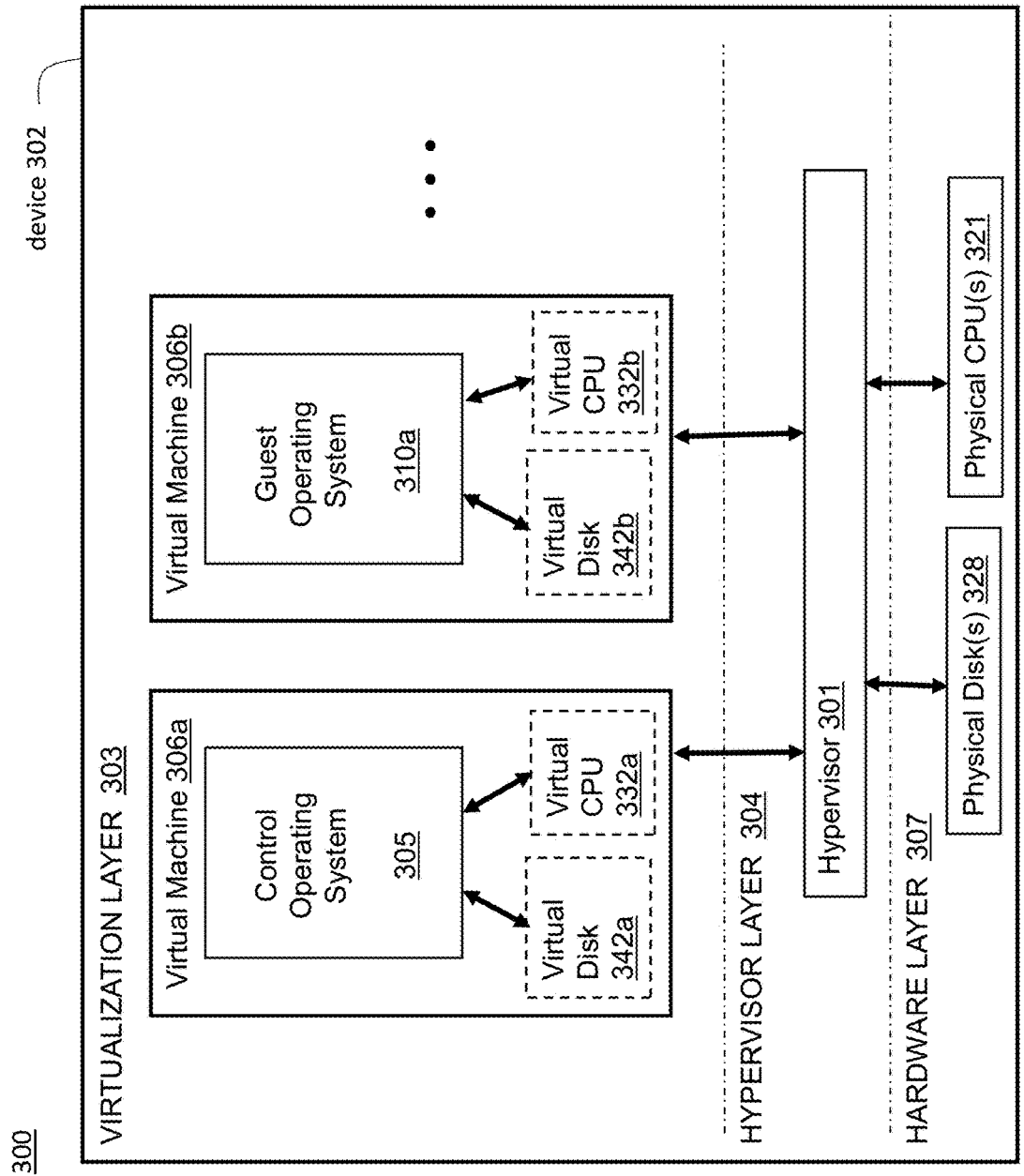
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. A plurality of appliances 200 or other computing devices (e.g., nodes) may be joined into a single cluster. A cluster may operate as an application server, network storage server, backup service, or any other type of computing device to perform many of the functions of appliances 200 and/or 205.

D. Providing Persistence for Applications Using a Content Switching Virtual Server Devices, systems and methods for providing persistence for applications using a content switching server are provided herein. A content switching virtual server can be provided to receive and process requests for applications to support and maintain persistence for sessions to the applications when multiple different versions of the applications are available and/or active. The content switching server can support persistence across multiple load balancing groups by selectively deploying new versions or updated versions of an application to clients based in part on properties and characteristics of the client and/or application to provide persistence for active, existing, or stateful sessions to the application.

During deployment or testing of new versions or features of an application, an active or existing session the same application can be interrupted or terminated in order to roll out and deploy the new version or new features of the application. For example, a server can receive a request for an application from a client in a first region. The server can forward the request to a first load balancing virtual server to handle the request and provide a first version of the application to the client. During the client session to the application, a second or new version of the application can be deployed that is to be tested or provided initially to a subset of clients from the first region (e.g., geographical region), the same region as the client. Thus, when the server receives a second request from the client to access the previous or existing session the application, the request is forwarded to a second load balancing virtual server that provides the second version of the application to the client. The previous or existing session to the application is unintentionally terminated and persistence is lost.

The content switching virtual servers as described herein can maintain and support persistence across multiple load balancing groups by selectively deploying versions and/or features of an application. The content switching virtual server can provide different content or versions of an application based in part on different properties and/or characteristics associated with the client and/or independent of the client. In embodiments, the content switching virtual server can distribute the requests to different load balancing servers based on a criteria that is independent of the attributes of the requesting client and/or request. The content switching virtual server can distribute or deploy different versions of the same application using the same content. The content switching virtual server can provide content specific based in part on a geographical location of the requesting client such that clients within a first geographical location can be provided a first version of the application and clients in a second geographical area can be provided a second version of the same application. The content switching virtual server can selectively deploy a new feature of an application to a subset of clients based in part on a geographical location of the subset of clients.

For example, the content switching virtual server can receive a request for an application from a client in a first region. The content switching virtual server can forward the request to a first load balancing virtual server to handle the request and provide a first version of the application to the client. The content switching virtual server can generate a session identifier (e.g., persistence session entry) for the session the application for the client to later identify and access the respective session. During the client session to the application, a second or new version of the application can be deployed that is to be tested or provided initially to a subset of clients from the first region (e.g., geographical region), the same region as the client. The content switching virtual server can receive a second request from the client to access the previous or existing session the application. The content switching virtual server can use the session identifier to identify the first load balancing virtual server as the appropriate server for the request and forward the second request the first load balancing virtual server instead of a second load balancing virtual server providing the second version of the application. The first load balancing virtual server can provide access to the previous or existing session to the application for the client to maintain a stateful nature of the application and support persistence for the client.

In embodiments, the content switching virtual server can receive a third request from a second, new client. The content switching virtual server can determine that the second client does not have a session identifier and is not associated with a previous or existing session to the application. The content switching virtual server can forward the third request from the second client to the second load balancing virtual server to deploy the new version of the application to the second client. Therefore, the content switching virtual server can provide support to maintain persistence across multiple load balancing groups using the content switching virtual server to provide a seamless transition of clients from one version of application to a second, different version of the application without negatively impacting or interrupting existing sessions to the application.

Figure 4:
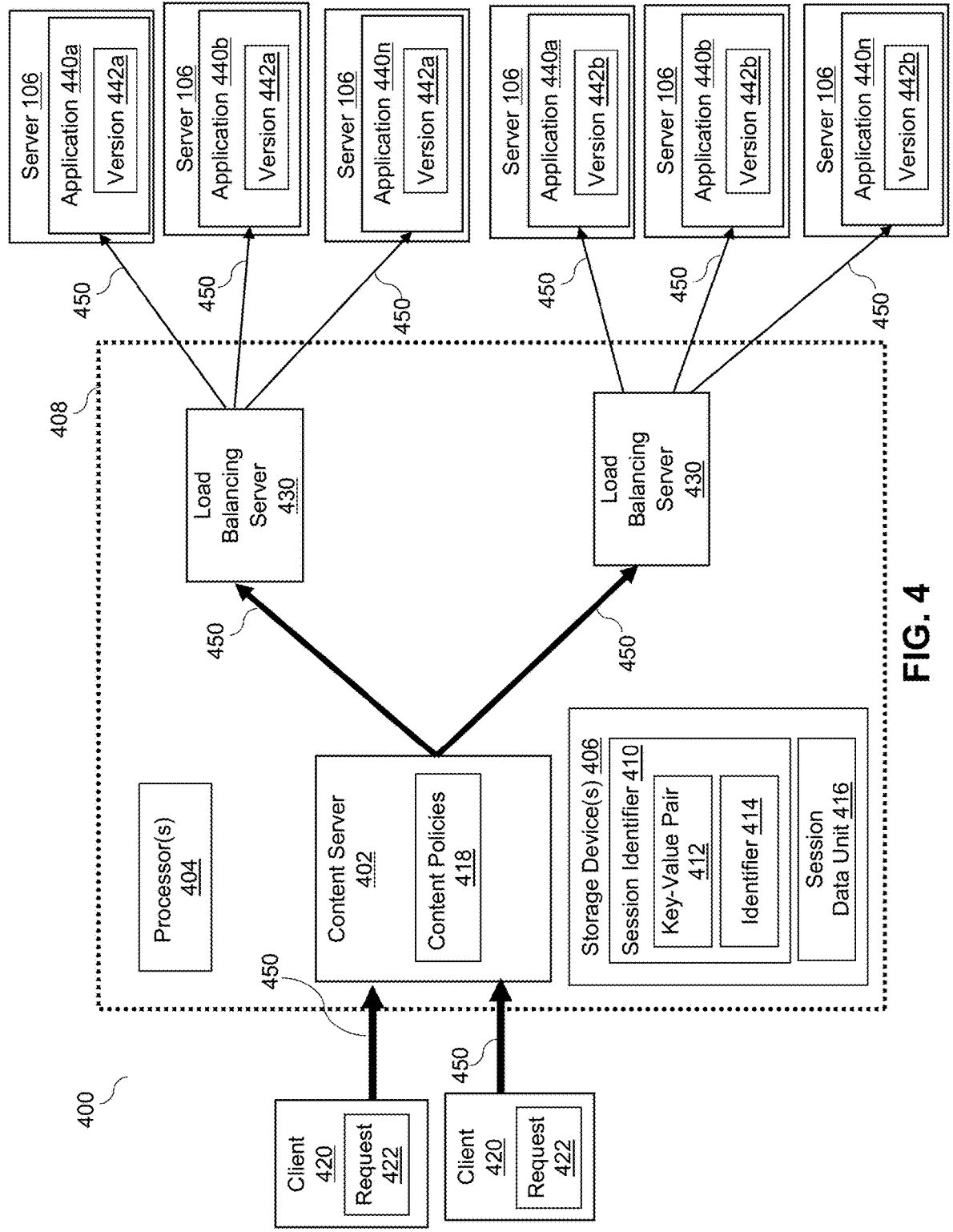
FIG. 4 is a block diagram of an embodiment of a system for providing persistence across applications using a content switching server.

Referring now to FIG. 4, an example system 400 for providing persistence across applications 440 using a content switching virtual server 402 is provided. In brief overview, the system 400 can include a device 408 that include a content switching virtual server 402 and one or more load balancing virtual servers 430. The content switching virtual server 402 can receive and manage one or more requests 422 received from one or more clients 420 and route the requests to the one or more load balancing virtual servers 430 based in part on properties and characteristics of the respective client 420 and/or a requested application 440.

The device 408 can include or correspond to computing device 302 described above with respect to FIG. 3. The device 408 can operate as an appliance cluster, application server, network storage server, backup service, or any other type of computing device. The device 408 can include or correspond to an appliance (e.g., application delivery controller (ADC). The device 408 can include or be formed from a plurality of connected or distributed computing devices or appliances (e.g., hardware appliances, virtual appliances). In embodiments, the device 408 can include a group or plurality of appliances working together as a single system image. The appliances can include single of multicore appliances. The device 408 can include or provide a centralized management system to perform load balancing, distribution, configuration, or other tasks to manage requests 422 received from one or more clients 420 across a plurality of load balancing virtual servers 430.

The device 408 can include a content switching virtual server 402. The content switching virtual server 402 can be implemented using hardware, software or a combination of hardware and software. The content switching virtual server 402 can include a virtual server, module or set of executable instructions at the device 408. The content switching virtual server 402 can manage one or more requests 422 from one or more clients 420 and select at least one load balancing virtual server 430 to handle a respective request 422 based in part on properties and/or characteristics of the client 420, the user associated with the client 420, the requested application 440 and/or one or more versions 442 of the requested application 440. The content switching virtual server 402 can include one or more processors 404 such as but not limited to processor(s) 103 described above with respect to FIG. 1C. The one or more processors 404 can execute or perform the functionalities of the method 500. The content switching virtual server 402 can include one or more storage devices 406 (e.g., memory). For example, the content switching virtual server 402 can include a storage 406, storage device or memory coupled with one or more processors 404.

The content switching virtual server 402 can include and apply one or more content switching policies 418 to one or more requests 422. The content switching policies 418 can indicate or define what type of request 422 is to be transmitted or forwarded to which load balancing virtual server 430. The content switching policies 418 can include, but not limited to, domain-based polices, URL-based policies and/or rule-based policies. The domain-based policies can include comparing a domain of an incoming URL associated with a request 422 with one or more domains identified in the content switching policies 418 to select a load balancing virtual server 430 for the request 422. The URL-based policies can include comparing an incoming URL associated with a request 422 with one or more URLs identified in the content switching policies 418 to select a load balancing virtual server 430 for the request 422. The rule-based policies can include comparing an incoming data from or associated with a request 422 with one or more expressions identified in the content switching policies 418 to select a load balancing virtual server 430 for the request 422.

The storage 406 can be a component of the content switching virtual server 402 and/or the device 408. For example, the device 408 can include one or more storage devices 406. The device 408 can include a storage 406, storage device or memory coupled with one or more processors 404. The storage 406 can include persistent storage devices or persistent memory. The storage 406 can be the same as or similar to memory 122, 128 described above with respect to FIG. 1C and/or memory 264 described above with respect to FIG. 2.

The storage 406 can include or store one or more session identifiers 410. The session identifier 410 can include or correspond to a persistence session entry, session persistence entry or session persistence profile. The session identifier 410 can include an identifier to identify or indicate at least one session 450 to at least one application 440 for a client 420. For example, at least one session identifier 410 can be generated for each session 450 established between an application 440 (e.g., application server, remote server) and a client 420. The session identifier 410 can include or be used to track and store session data for the respective session 450. In embodiments, the processor 404 and/or content switching virtual server 402 can track and store session data for a session 450 in the associated session identifier 410. The session data can include properties and/or characteristics of a client 420, a request 422, an application 440, a version 442 of the application 440 and/or a session 450. The session data can include a session data unit 416. The session data can include, but not limited to, a source internet protocol (IP) address, a HyperText Transfer Protocol (HTTP) cookie or a secure sockets layer (SSL) session identifier.

The session identifier 410 can include a plurality of key-value pairs 412. At least one key-value pair 412 can be generated for each session 450 between a client 420 and an application 440. The key-value pairs 412 can include or correspond to two linked data items, for example, a key portion and a value portion. The key portion can include or be associated with an identifier 414 included with a request 422 received from a client 420. In embodiments, the key portion can include an IP address associated with a client 420 or other forms of data identifying the client 420 or location information for the client 420. The key portion of the key-value pair 412 can be used to lookup the corresponding or associated key-value pair 412, for example, into a distributed key-value store of the storage 406. The value portion can include or be associated with a load balancing virtual server 430, for example, a selected load balancing virtual server 430 selected to handle at least one request 422. The value portion can identify the load balancing virtual server 430, an application 440 and/or a version 442 of the application 440. The key portion and the value portion can include a number, alphanumeric character, script or code.

The identifier 414 can include or correspond to an identifier, a value, or an index value identifying a client 420 or a user of a client 420. In embodiments, the identifier 414 can include but not limited to, a source internet protocol (IP) address, a HyperText Transfer Protocol (HTTP) cookie or a secure sockets layer (SSL) session identifier. The session data unit 416 can include an identifier, a value, or an index value identifying a session 450. At least one session data unit 416 can be generated for each session 450.

The clients 420 can include a client device. For example, the client 420 can be an instance of any client device described herein. The client 420 can be the same as or substantially similar to client 102 described above with respect to FIGS. 1A-1B and/or computer 101 described above with respect to FIG. 1C. The client 420 can include, but not limited to, computing devices, desktop computing devices, and/or mobile computing devices. The client 420 can include or store properties and/or characteristics for one or more users of the client 420. The properties and/or characteristics of a user can include, but not limited to: an identify of the user, a user profile, a home location of the user, and/or a location (e.g., geographical address, IP address) of one or more clients 420 associated with the user. The client 420 can generate and transmit one or more requests 422 for an application 440. The request 422 can include an identifier 414 associated with the client 420 and/or user associated with the client 420, an indication of an application 440, a version 442 of an application 440, a session data unit 416 associated with at least one previous or existing session 450 to an application 440 and/or a key-value pair 412.

The load balancing virtual servers 430 can be implemented using hardware, software or a combination of hardware and software. The load balancing virtual servers 430 can include a virtual server, module or a set of executable instructions executing at the device 408 configured to perform load balancing, distribution, configuration, or other tasks associated with distributing one or more requests 422 between a plurality of applications 440 or endpoints (e.g., application servers, third party servers, remote servers) The load balancing virtual servers 430 can be assigned to or manage a load balancing group, service group and/or application group including a group of endpoints, services and/or applications 440 provided by the device 408. For example, a load balancing virtual server 430 can receive a request 422 from the content switching virtual server 402 and the load balancing virtual server 430 can select at least one application 440 of the plurality of applications 440 to handle or process the request 422. The load balancing virtual servers 430 can be selected to support, manage and/or serve at least one version 442 of an application 440. For example, a first load balancing virtual server 430*a* can support, manage and/or serve a first version 442*a* of a first application 440*a* and a second, different load balancing virtual server 430*b* can support, manage and/or serve a second version 442*b* of the first application 440*a*. In embodiments, the second version 442*b* of the first application 440*a* can be different from the first version 442*a* of the first application 440*a*.

In embodiments, the content switching virtual server 402 and the load balancing virtual servers 430 can execute on the same device 408. In some embodiments, one or more load balancing virtual servers 430 can run or execute on a device separate from the content switching virtual server 402. For example, in embodiments, one or more load balancing virtual servers 430 can run or execute on a device separate from the device 408.

The applications 440 can include or correspond to network applications, applications (apps) that are served from and/or hosted on one or more servers (e.g., remote servers, application servers, third part servers, servers independent of the device 408). In embodiments, the applications 440 can run on at least one server 106 such as but not limited to servers 106 described above with respect to FIGS. 1A-1B. The applications 440 can include an application hosted on at least one server 106 and accessed by at least one client 420 through one or more sessions 450. In embodiments, the applications 440 can include, but not limited to, a web application, a desktop application, remote-hosted application, a virtual application, a software as a service (SaaS) application, a mobile application, an HDX application, a local application, a native application (e.g., native to a client 420), and/or a device couple with a client 420. The applications 440 can include one or more versions 442. For example, a new or second version 442 can be generated to deploy updates, new applications 440 and/or one or more new features for an existing application 440. The different versions 442 can correspond to or be associated with the same application 440. In embodiments, the different versions 442 can correspond to or be associated with the same application 440 providing the same or similar content but include one or more different features. For example, a first version 442 can correspond to an original, initial and/or previous version 442 of an application 440 and a second version 442 can correspond to an updated version, new version or a version 442 of an application 440 including one or more new features as compared to an original, initial and/or previous version 442 of the application 440.

The sessions 450 can include or correspond to a channel, connection or session between a client 420 and the content switching virtual server 402. The sessions 450 can include or correspond to a channel, connection or session between a client 420 and an application 440 through the content switching virtual server 402 and a load balancing virtual server 430. In embodiments, the sessions 450 can include encrypted and/or secure connections between a client 420 and the content switching virtual server 402 and/or between a client 420 and an application 440 through the content switching virtual server 402 and a load balancing virtual server 430. The encrypted sessions 450 can include encrypted files, data and/or traffic transmitted between the between a client 420 and the content switching virtual server 402 and/or between a client 420 and an application 440 through the content switching virtual server 402 and a load balancing virtual server 430.

Each of the above-mentioned elements or entities is implemented in hardware, or a combination of hardware and software, in one or more embodiments. Each component of the content switching virtual server 402 and/or device 408 may be implemented using hardware or a combination of hardware or software detailed above in connection with FIG. 4. For instance, each of these elements or entities can include any application, program, library, script, task, service, process or any type and form of executable instructions executing on hardware of a content switching virtual server 402 and/or device 408. The hardware includes circuitry such as one or more processors in one or more embodiments. In some embodiments, the components of at least one content switching virtual server 402 and/or device 408 may be implemented or include a non-transitory computer-readable medium that includes instructions that, when executed by a processor of the respective content switching virtual server 402 and/or device 408 cause the processor to execute or perform the functionalities of the method 500.

Figure 5A:
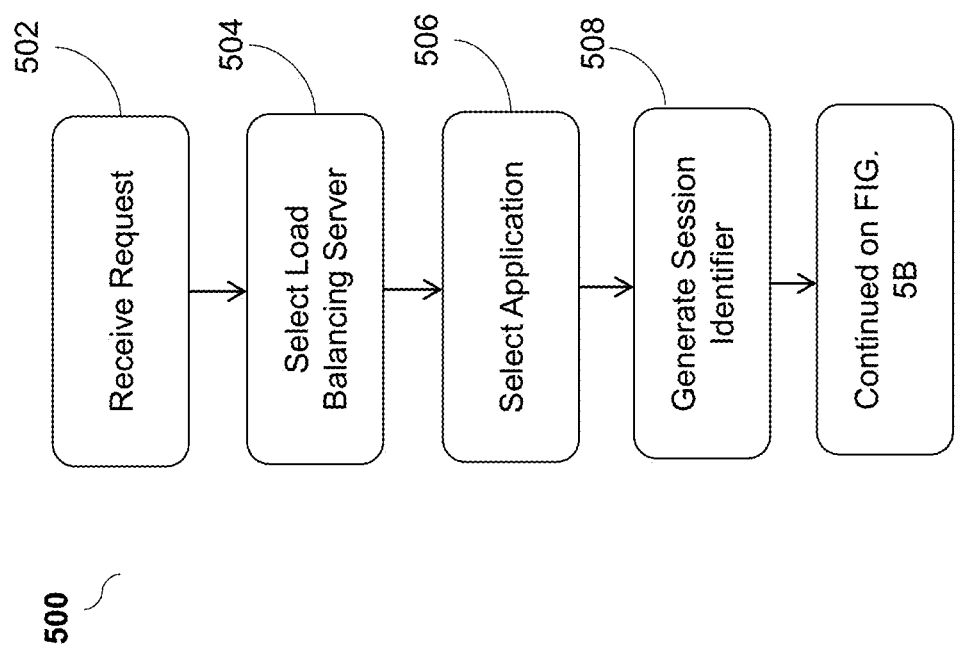
FIGS. 5A-5C include a flow chart illustrating a process or method for providing persistence across applications using a content switching server, according to an example implementation of the present disclosure.
Figure 5B:
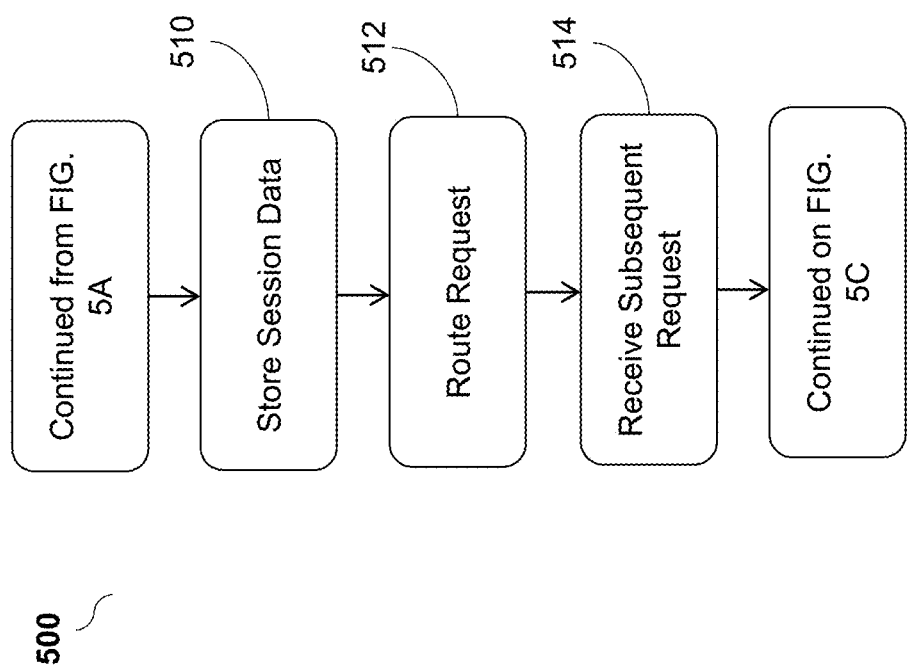
Figure 5C:
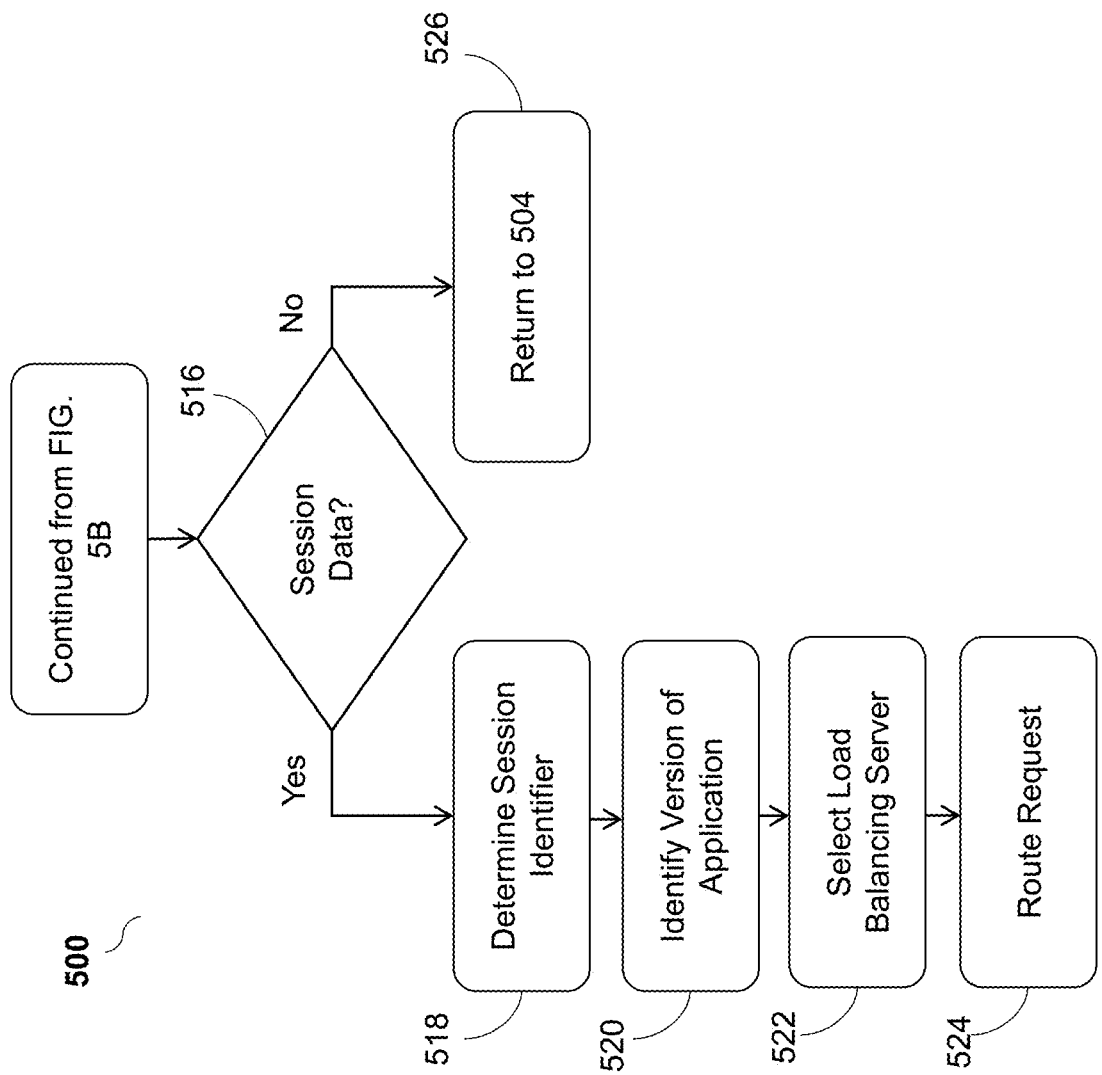

Referring now to FIGS. 5A-5C, a method 500 for providing persistence across applications using a content switching virtual server. In brief overview, the method 500 can include one or more of: receiving a request (502), selecting a load balancing virtual server (504), selecting an application (506), generating a session identifier (508), storing session data (510), routing the request (512), receiving a subsequent request (514), determining if session data is included with the subsequent request (516), if yes, determining the session identifier (518), identifying a version of the application (520), selecting the load balancing virtual server (522), routing the request (524), if no session data is included with the subsequent request, the method 500 can return to 504 to apply content policies (526). Any of the foregoing operations may be performed by any one or more of the components or devices described herein, for example, a content switching virtual server 402, one or more processors 404 and/or a device 408.

Referring to 502, and in some embodiments, a request 422 can be received. A request 422 can be received from at least one client 420 to access or establish a session 450 to at least one application 440. In embodiments, the content switching virtual server 402 can receive a first request 422 from a first client 420 of the plurality of clients 420 for a first version 442 of an application 440 of the plurality of applications 440 having different versions 442 provided by one or more servers. In embodiments, the device 408 can provide access to each version 442 of the application 440 via a different load balancing virtual server 430 of a plurality of load balancing virtual servers 430 of the device 408. Each of the load balancing virtual servers 430 can manage access to one or more versions 442 of each application 440 of the plurality of applications 440. For example, the device 408 can select or establish a different load balancing virtual server 430 of the plurality of load balancing virtual servers 430 of the device 408 for accessing each version 442 of a plurality of versions 442 of an application provided by one or more servers. In embodiments, at least one version 442 of an application 440 can be managed or load balanced via at least one load balancing virtual server 430 of the device 408.

The request 422 can be received at or land at the content switching virtual server 402. For example, the request 422 can be transmitted to the device 408. The content switching virtual server 402 can include or correspond to a front end or initial portion of the device 408 to receive, manage and distribute requests 422 across the plurality of load balancing virtual servers 430. The content switching virtual server 402 can front end the plurality of load balancing virtual servers 430 and/or other forms of server groups of the device 408.

The request 422 can include or identify at least one application 440, a version of the application 440 and/or an identifier 414 for the client 420 that transmitted and/or generated the respective request 422. For example, a header portion of the request 422 can include application information, version information, and/or device information. In some embodiments, the request 422 can include one or more cookies inserted or included within the header of the request 422 to identify an application 440, a version 442 of an application 440, and/or a client 420.

Referring to 504, and in some embodiments, a load balancing virtual server 430 can be selected. The content switching virtual server 402 can select a load balancing virtual server 430 to handle the first request 422 for the first version 442 of the application 440. In some embodiments, the content switching virtual server 402 can apply one or more content switching policies 418 to the request 422 to select the load balancing virtual server 430. The content switching policies 418 can identify at least one version 442 of the application 440 for the request 422 and the load balancing virtual server 430 providing the at least one version 442 of the application 440.

The content switching virtual server 402 can apply one or more content switching policies 418 to make a content switching decision and choose or select a load balancing virtual server 430 to serve the request 422. The content switching policies 418 can include or define the type of request 422 to be redirected to a load balancing virtual server 430. For example, the content switching virtual server 402 can apply content switching policies 418, including but not limited to, domain based policies, URL-based policies, and/or rule-based policies to the request 422. In embodiments, the content switching virtual server 402 can apply domain-based policies by comparing a domain of an incoming URL associated with a request 422 with one or more domains identified in the content switching policies 418 to select a load balancing virtual server 430 for the request 422. The content switching virtual server 402 can apply URL-based policies by comparing an incoming URL associated with a request 422 with one or more URLs identified in the content switching policies 418 to select a load balancing virtual server 430 for the request 422. The content switching virtual server 402 can apply rule-based policies can include comparing an incoming data from or associated with a request 422 with one or more expressions identified in the content switching policies 418 to select a load balancing virtual server 430 for the request 422. The content switching virtual server 402 can select at least one load balancing virtual server 430 to handle the request 422.

Referring to 506, and in some embodiments, an application can be selected. In embodiments, the load balancing virtual server 430 can select at least one application 440 of the plurality of applications 440 for the request 422. The load balancing virtual server 430 can make a load balancing determination to distribute one or more requests 422 across the plurality of applications 440. For example, the load balancing virtual server 430 can determine the type of application 440 for the request 422. The load balancing virtual server 430 can determine a current load on one or more applications 440 corresponding to the requested type of application 440. In embodiments, the load balancing virtual server 430 can determine a number of sessions 450 (e.g., active, existing) to the applications 440. The load balancing virtual server 430 can select an application 440 for the request 422 based in part on an availability of the application, a load or number of sessions 450 (e.g., active, existing) to the application 440 and/or a load metric across the plurality of applications 440.

Referring to 508, and in some embodiments, a session identifier 410 can be generated. The content switching virtual server 402 can generate a session identifier 410 for a session 450 between the first client 420 and the first version 442 of the application 440 to persist the session 450 with the selected load balancing virtual server 430 for subsequent requests 422 from the first client 420 for the first version 442 of the application 440. The session identifier 410 can include a key-value pair 412. The key of the key-value pair 412 can be associated with or correspond to an identifier 414 included with the request 422. The value of the key-value pair 412 can be associated with or correspond to the selected load balancing virtual server 430.

The content switching virtual server 402 can generate a session identifier 410 (e.g., persistence session entry) to maintain persistence for the respective session 450 when the session 450 is established. The content switching virtual server 402 can use device data, application data, and/or session data to establish the session identifier 410. For example, the content switching virtual server 402 can use the identifier 414 included with the request 422 to determine a source internet protocol (IP) address of the client 420, a HyperText Transfer Protocol (HTTP) cookie and/or or a secure sockets layer (SSL) session identifier for a session 450 between the client 420 and the application 440. The content switching virtual server 402 can generate a key-value pair 412 for the session identifier 410. In embodiments, the content switching virtual server 402 can generate a session identifier 410 (e.g., persistence session entry) using an IP address (e.g., source IP address, client IP address) of the client 420 that transmitted the request as the key of the key-value pair 412 and the destination deployment (e.g., selected application 440, endpoint) or load balancing virtual server 430 as the value of the key-value pair 412. The content switching virtual server 402 can provide to the first client 420, the session identifier 410 for the session 450 between the first client 420 and the first version 442 of the application 440. In embodiments, the content switching virtual server 402 can transmit the session identifier 410 to the first client 420 through at least one connection between the first client 420 and the device 408.

Referring now to 510, and in some embodiments, the session data can be stored. The content switching virtual server 402 can store the session data, including the session identifier 410, the key-value pair 412, the identifier 414 and/or a session data unit 416 in a storage 406. The storage 406 can maintain a plurality of session identifiers 410 and a plurality of corresponding key-value pairs 412 associated with previous requests 422. In embodiments, the storage 406 can include or correspond to a key-value store, database or lookup table. The content switching virtual server 402 can use the storage 406 to maintain session identifiers 410 and key-value pairs 412 associated with sessions 450 between one or more clients 420 and one or more applications 440 to provide support and maintain persistence for the respective sessions 450.

Referring now to 512, and in some embodiments, the request can be routed. The content switching virtual server 402 can route or forward the request to the selected load balancing virtual server 430 to establish the session 450 between the client 420 and the application 440. In embodiments, the session 450 can be established between the client 420 and the application 440. In some embodiments, the session 450 can be established between the client 420 and the application 440 independent of the load balancing virtual server 430. The session 450 can include a session data unit 416 identifying the respective session 450, the client 420, the application 440 and a version 442 of the application 440. The client 420 can include a client application to access, host or provide the application 440 for a user associated with the client 420 through the client 420. In embodiments, the application 440 can be hosted or provided by a third party server, remote server or the device 408 and the client 420 can connect to the third party server, remote server or the device 408 to access or provide the application 440 to a user associated with the client 420.

Referring now to 514, and in some embodiments, a subsequent request can be received. The content switching virtual server 402 can receive a second request 422. The second or subsequent request 422 can be generated by the first client 420 that generated the first request 422 or the second or subsequent request 422 can be generated by a second client 420. For example, the second request 422 can include an identifier 414 indicating the client 420 that generated the respective request 422. In some embodiments, the content virtual switching virtual server 402 can identify a first identifier (e.g., session identifier 410, identifier 414) of a first request 422 (e.g., first request, subsequent request) received by a client 420 of the plurality of clients 420 to access a first version 442 of the plurality of versions 442 of the application 440. The request 422 can include or identify at least one application 440 and/or a version of the application 440. The content switching virtual server 402 can determine that a header portion of the second request 422 includes an identifier 414, a session data unit 416, an indication of a version 442 of an application 440, and/or a cookie identifying a load balancing virtual server 430. In embodiments, the content switching virtual server 402 can extract or retrieve the identifier 414, the session data unit 416, an indication of a version 442 of an application 440, and/or the cookie identifying a load balancing virtual server 430 from the header of the second request 422. The content switching virtual server 402 can determine which client 420 transmitted the request 422.

Referring now to 516, and in some embodiments, the content switching virtual server can determine if session data is included with the subsequent request. The content switching virtual server 402 can determine if the second or subsequent request 422 included session data identifying or indicating a previous session 450 to a version 442 of an application 440. For example, the content switching virtual server 402 can determine if the second request 422 includes session data. The session data can include, but not limited to, an identifier 414, a session data unit 416 and/or a cookie identifying a previous session 450 to a version 442 of an application 440 and/or a load balancing virtual server 430 that provided access to the version 442 of the application 440 for the previous session 450. In embodiments, the second request 422 can include a cookie or another form of identifier that includes the session data. The cookie or identifier can include a unique identifier for identifying the load balancing virtual server to which a first or previous request from the client 420 was forwarded.

Referring now to 518, and in some embodiments, if yes, a session identifier can be determined. The content switching virtual server 402 can determine that the second request 422 does include session data and extract the cookie and/or identifier from the second request 422 to perform a lookup to the storage 406 of the device 408. The content switching virtual server 402 can search or perform a lookup to the storage 406 to identify the session identifier 410. In embodiments, the content switching virtual server 402 can use the cookie or session identifier 414 to identify one or more previous sessions 450 established for the client 420 that transmitted the second request 422.

For example, the cookie or identifier (e.g., identifier 414, session data unit 416) can indicate the client 420 that generated the second request 422, a requested version 442 of the application 440, a previous session 450 to the requested version 442 of the application 440 and/or a load balancing virtual server 430 that handled the previous request 422 for the requested version 442 of the application 440. The content switching virtual server 402 can use the cookie or an identifier 414 to identify one or more session identifiers 410 generated for the client 420. The content switching virtual server 402 can use the cookie or an identifier 414 to identify a load balancing virtual server 430 that handled a previous request 422 from the client 420. The content switching virtual server 402 can perform the lookup using the extracted cookie and/or identifier from the second request 422 to identify the session identifier 410 generated for the previous session 450 between the client 420 and the version 442 of the application 440. The session identifier 410 can indicate the load balancing virtual server 430 that handled the previous request 422 for the version 442 of the application 440 and/or provided access to the version 442 of the application 440.

Referring now to 520, and in some embodiments, a version of the application can be identified. The content switching virtual server 402 can use the session identifier 410 to identify the version 442 of the application 440. The session identifier 410 can identify the version 442 of the application 440 accessed during the previous session 450 or responsive to a previous request 422 from the client 420. The content switching virtual server 402 can select the version 442 of the application 440 using the version 442 indicated in the session identifier 410. In embodiments, the content switching virtual server 402 can compare the version 442 of the application 440 requested or indicated in the second request 422 to the version 442 of the application 440 identified in the session identifier 410. The content switching virtual server 402 can determine that the version 442 of the application 440 requested or indicated in the second request 422 matches or is the same as the version 442 of the application 440 identified in the session identifier 410. The content switching virtual server 402 can select the version 442 of the application 440 responsive to the comparison.

Referring now to 522, and in some embodiments, the load balancing virtual server can be determined. The content switching virtual server 402 can use the session identifier 410 to identify the load balancing virtual server 430 to handle the second request 422. The session identifier 410 can identify the load balancing virtual server 430 that provided access to the version 442 of the application 440 accessed during the previous session 450 or responsive to a previous request 422 from the client 420. The session identifier 410 can identify the load balancing virtual server 430 that handled the previous request 422 from the client 420 for the version 442 of the application 440. The content switching virtual server 402 can select the same load balancing virtual server 430 that provided access for the previous session 450 of handled the previous request 422 to handle the second request 422.

In embodiments, the content switching virtual server 402 can use the determined version 442 to select the load balancing virtual server 430. For example, each of the load balancing virtual servers 430 can handle or manage at least one version 442 of an application 440 and distribute requests 422 or load across the applications 440 of the same version 442. The content switching virtual server 402 can use the determined version 442 to identify the appropriate or correct load balancing virtual server 430 of the plurality of load balancing virtual servers 430 that handles or manages the respective version 442. The content switching virtual server 402 can select the load balancing virtual server 430 to provide access to the version 442 of the application 440 for the client 420.

Referring now to 524, and in some embodiments, the request can be routed. The content switching virtual server 402 can forward or route the second request 422 or a subsequent request 422 from the first client 420 to access the first version 442 of the application 440 to the selected load balancing virtual server 430 responsive to identifying the session identifier 410 associated with the second request 422 or subsequent request 422. The load balancing virtual server 430 can provide access to the requested version 442 of the application 440 for the client 420 through at least one session 450. The load balancing virtual server 430 can receive the second request 422 and select at least application 440 that includes the requested version 442 of the application 440.

The load balancing virtual server 430 can select the application 440 based in part on the respective version 442 and/or a load metric (e.g., number of connections, number of session) to the respective application 440. In embodiments, the load balancing virtual server 430 can determine load metric for multiple applications 440 provided the requested version 442 of the application 440 and select at least one application 440 using the determined load metrics. In some embodiments, the load balancing virtual server 430 can determine load metric for multiple applications 440 provided the requested version 442 of the application 440 and select at least one application 440 using the determined load metrics.

In embodiments, a subsequent or second session 450 can be established between the client 420 and the version 442 of the application 440. In some embodiments, the device 408 can establish the session 450 between the client 420 and the version 442 of the application 440 responsive to the load balancing virtual server 430 selecting the application 440 for the second request 422. The second session 450 can include a session data unit 416 identifying the respective session 450, the client 420, the application 440 and the version 442 of the application 440. The client 420 can include a client application to access, host or provide the version 442 of the application 440 for a user of the client 420 through the client 420. In embodiments, the application 440 can be hosted or provided by a server independent of the device 408, a third party server, or a remote server. The subsequent or second session 450 can be established between the client 420 and the server independent of the device 408, a third party server, and/or remote server providing the version 442 of the application 440. In embodiments, the device 408 or the client 420 can connect to the independent server, third party server, and/or remote server to access or provide the version 442 of the application 440 to a user of the client 420.

Referring now to 526, and in some embodiments, if no session data is included with the subsequent request, the method 500 can return to 504. In embodiments, the content switching virtual server 402 can determine that the second request 422 does not include session data, include a cookie or identifier identifying a previous session 450 and/or include a session identifier 410. The content switching virtual server 402 can determine that the second request 422 if from a new client 420 or a client 420 not having an existing persistence session to an application 440. For example, the content switching virtual server 402 can receive a third request 422 from a second client 420 for at least one version 442 of the application 440. The method 500 can return to 504 to select a load balancing virtual server 430 to handle the second request 422. For example, the content switching virtual server can select a second load balancing virtual server 430 from the plurality of load balancing virtual servers 430 to handle the third request 420. The second load balancing virtual server 430 can provide access to a second version 442 of the application 440. The second load balancing virtual server 430 can be different from the first load balancing virtual server 430 that handled the first request 422 from the first client 420. The second version 442 of the application 440 can be different, such as an updated or include one or more different features as compared with the first version 442 of the application 440 (e.g., different versions of same application). The content switching virtual server 402 can route or forward, using a second session identifier 410, the third request 422 to the selected second load balancing virtual server 430 to provide access to the second version 442 of the application 440 for the second client 420.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a device intermediary to a plurality of clients and a plurality of applications executed on one or more servers, a first request from a first client of the plurality of clients for a first version of an application of the plurality of applications having different versions provided by the one or more servers, the device executing a plurality of load balancing virtual servers each configured to provide access to a different version of the application;
selecting, by a content switching virtual server of the device, a load balancing virtual server from the plurality of load balancing virtual servers executed by the device to handle the first request for the first version of the application;
generating, by the content switching virtual server, a session identifier for a session between the first client and the first version of the application that indicates the first client and the load balancing virtual server selected to handle the first request to persist the session with the selected load balancing virtual server for subsequent requests from the first client for the first version of the application;
providing, by the content switching virtual server to the first client, the session identifier corresponding to the session between the first client and the first version of the application persisted by the selected load balancing virtual server; and
forwarding, by the content switching virtual server, a second request from the first client to access the first version of the application to the selected load balancing virtual server responsive to identifying the session identifier included with the second request.

2. The method of claim 1, further comprising:
receiving, by the content switching virtual server, a third request from a second client for at least one version of the application;
selecting, by the content switching virtual server, a second load balancing virtual server from the plurality of load balancing virtual servers to handle the third request, the second load balancing virtual server providing access to a second version of the application; and
routing, by the content switching virtual server using a second session identifier, the third request to the selected second load balancing virtual server to provide access to the second version of the application for the second client.

3. The method of claim 1, wherein the session identifier includes a data unit included with the request and a value associated with the selected load balancing virtual server; and wherein the data unit includes at least one of a source internet protocol (IP) address, a HyperText Transfer Protocol (HTTP) cookie or a secure sockets layer (SSL) session identifier.

4. The method of claim 1, further comprising:
determining, by the content switching virtual server, if the session identifier is to be created for the first client through a lookup to a storage of the device using a data unit included with the request; and
generating, by the content switching virtual server, responsive to the lookup, the session identifier for the session between the first client and the first version of the application.

5. The method of claim 1, comprising:
identifying, by the content switching virtual server, an internet protocol (IP) address associated with the first client; and
generating, by the content switching virtual server, the session identifier for the session between the first client and the first version of the application using the IP address associated with the first client.

6. The method of claim 1, comprising:
identifying, by the content switching virtual server, a data unit for a secure sockets layer (SSL) session between the first client and the first version of the application; and
generating, by the content switching virtual server, the session identifier for the session between the first client and the first version of the application with the session identifier corresponding to the data unit for the SSL session between the first client and the first version of the application.

7. The method of claim 1, comprising:
inserting, by the content switching virtual server, a cookie into a header of a response to the first request from the first client, the cookie identifying the selected load balancing virtual server.

8. The method of claim 7, comprising:
receiving, by the content switching virtual server, a third request from the first client for the first version of the application, the third request including the cookie; and
determining, by the content switching virtual server, the session identifier associated with the first client using the cookie, the session identifier corresponding to the session between the first client and the first version of the application.

9. The method of claim 8, comprising:
routing, by the content switching virtual server using the session identifier, the third request to the selected load balancing virtual server to provide access to the first version of the application.

10. A method comprising:
establishing, by a device intermediary to a plurality of clients and an application, a corresponding load balancing virtual server of a plurality of load balancing virtual servers executed by the device, each of the plurality of load balancing virtual servers configured to provide access to a different version of a plurality of versions of the application provided by one or more servers;
identifying, by a content switching virtual server of the device, a first identifier of a first request received by a first client of the plurality of clients to access a first version of the plurality of versions of the application corresponding to a first load balancing virtual server of the plurality of load balancing virtual servers executed by the device, the first identifier indicating the first client and the load balancing virtual server selected for the first client to access the first version of the application;
determining, by the content switching virtual server using the first identifier, the first load balancing virtual server of the plurality of load balancing virtual servers was selected for the first client to access the first version of the application responsive to a previous request between the first client and the first version of the application; and routing, by the content switching virtual server, the first request to the first load balancing virtual server to provide the first client access to the first version of the application.

11. The method of claim 10, further comprising:
receiving, by the content switching virtual server, a second request from a second client for the first version of the application; and
identifying, by the content switching virtual server, a second identifier included with the second request.

12. The method of claim 11, further comprising:
performing, by the content switching virtual server, using the second identifier included with the second request, a lookup to a storage of the device for a session identifier associated with the second client; and
determining, by the content switching virtual server responsive to the lookup, that a session identifier is to be generated for the second client.

13. The method of claim 11, further comprising:
selecting, by the content switching virtual server, a second load balancing virtual server to provide a second version of the application to the second client, the second version different from the first version.

14. The method of claim 13, further comprising:
generating, by the content switching virtual server, a session identifier for a session between the second client and the second version of the application, the session identifier comprising the first identifier included with the second request and a value associated with the second load balancing virtual server; and
routing, by the content switching virtual server, the second request to the second load balancing virtual server to provide access to the second version of the application for the second client.

15. A system comprising:
a device intermediary to a plurality of clients and a plurality of applications, the device comprising one or more processors coupled to memory; and
the one or more processors configured to:
receive a first request from a first client of the plurality of clients for a first version of an application of the plurality of applications having different versions provided by one or more servers, the device executing a plurality of load balancing virtual servers each configured to provide access to a different version of the application;
select, via a content switching virtual server of the device, a load balancing virtual server from the plurality of load balancing virtual servers executed by the device to handle the first request for the first version of the application;
generate a session identifier for a session between the first client and the first version of the application that indicates the first client and the load balancing virtual server selected to handle the first request to persist the session with the selected load balancing virtual server for subsequent requests from the first client for the first version of the application;
provide, to the first client, the session identifier corresponding to the session between the first client and the first version of the application persisted by the selected load balancing virtual server; and
forward a second request from the first client to access the first version of the application to the selected load balancing virtual server responsive to identifying the session identifier included with the second request.

16. The system of claim 15, wherein the one or more processors are further configured to:
receive a third request from a second client for at least one version of the application;
select a second load balancing virtual server from the plurality of load balancing virtual servers to handle the third request, the second load balancing virtual server providing access to a second version of the application; and
route, using a second session identifier, the third request to the selected second load balancing virtual server to provide access to the second version of the application for the second client.

17. The system of claim 15, wherein the session identifier includes a data unit included with the request and a value associated with the selected load balancing virtual server; and wherein the data unit includes at least one of a source internet protocol (IP) address, a HyperText Transfer Protocol (HTTP) cookie or a secure sockets layer (SSL) session identifier.

18. The system of claim 15, wherein the one or more processors are further configured to:
determine if the session identifier is to be created for the first client through a lookup to a storage of the device using a data unit included with the request; and
generate, responsive to the lookup, the session identifier for the session between the first client and the first version of the application.

19. The system of claim 15, wherein the one or more processors are further configured to:
identify an internet protocol (IP) address associated with the first client; and
generate the session identifier for the session between the first client and the first version of the application using the IP address associated with the first client.

20. The system of claim 15, wherein the one or more processors are further configured to:
receive a third request from the first client for the first version of the application, the third request including a cookie;
determine the session identifier associated with the first client using the cookie, the session identifier corresponding to the session between the first client and the first version of the application; and
route, using the session identifier, the third request to the selected load balancing virtual server to provide access to the first version of the application.

* * * * *